United States Patent
Baba

(10) Patent No.: US 11,518,643 B2
(45) Date of Patent: Dec. 6, 2022

(54) IMAGE FORMING SYSTEM THAT OUTPUTS SHEET BUNDLE, METHOD FOR CONTROLLING OPERATION OF IMAGE FORMING APPARATUS

(71) Applicant: KYOCERA Document Solutions Inc., Osaka (JP)

(72) Inventor: Masaki Baba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 295 days.

(21) Appl. No.: 16/880,200

(22) Filed: May 21, 2020

(65) Prior Publication Data

US 2020/0377328 A1 Dec. 3, 2020

(30) Foreign Application Priority Data

May 28, 2019 (JP) .............................. JP2019-099367

(51) Int. Cl.
*B65H 39/04* (2006.01)
*B65H 37/04* (2006.01)
*H04N 1/00* (2006.01)

(52) U.S. Cl.
CPC ............ *B65H 39/04* (2013.01); *B65H 37/04* (2013.01); *H04N 1/00411* (2013.01); *H04N 1/00631* (2013.01)

(58) Field of Classification Search
CPC ........ B65H 39/04; B65H 37/04; B65H 33/04; G03G 15/655
See application file for complete search history.

(56) References Cited

U.S. PATENT DOCUMENTS 5,839,045 A * 11/1998 Wierszewski ........ G03G 15/655
399/397
7,248,377 B2 * 7/2007 Nimura .................. B65H 33/04
358/1.9

(Continued)

FOREIGN PATENT DOCUMENTS

JP      2003001910 A    1/2003
JP      2010044429 A    2/2010

OTHER PUBLICATIONS

China National Intellectual Property Administration, Office Action and Search Report Issued in Application No. 202010429361.3, dated Dec. 3, 2021, 10 pages.

*Primary Examiner* — Patrick H Mackey
(74) *Attorney, Agent, or Firm* — Alleman Hall Creasman & Tuttle LLP

(57) ABSTRACT

An image forming system includes a conveyance processing portion, a setting processing portion, an insertion processing portion, and an operation control portion. The conveyance processing portion executes a conveyance process to convey a plurality of sheets placed on a sheet placing portion, sequentially to a sheet stack portion. When the insertion timing to insert the insertion sheet comes during an execution of the conveyance process, the insertion processing portion executes an insertion process to convey a sheet from the sheet supply source of the insertion sheet to the sheet stack portion. The operation control portion is configured to control operations of an image forming apparatus during execution of a sheet bundle output process based on the sheet type of the insertion sheet conveyed in the insertion process that is included in the sheet bundle output process, the sheet bundle output process including the conveyance process and the insertion process.

10 Claims, 7 Drawing Sheets

(56) References Cited

U.S. PATENT DOCUMENTS

| | | | | |
|---|---|---|---|---|
| 7,603,072 B2 * | 10/2009 | Yokobori | ............... | B65H 39/04 |
| | | | | 399/382 |
| 7,878,497 B2 * | 2/2011 | Adachi | ................. | B65H 33/04 |
| | | | | 270/58.23 |
| 8,469,349 B2 * | 6/2013 | Maeda | ................. | G03G 15/655 |
| | | | | 399/382 |
| 9,283,796 B2 * | 3/2016 | Mutsuno | ............ | G03G 15/5016 |
| 10,828,925 B2 * | 11/2020 | Kubo | .................... | B65H 31/24 |
| 2020/0356038 A1 * | 11/2020 | Nishikata | ........... | G03G 15/6508 |

* cited by examiner

IMAGE FORMING SYSTEM THAT OUTPUTS SHEET BUNDLE, METHOD FOR CONTROLLING OPERATION OF IMAGE FORMING APPARATUS

INCORPORATION BY REFERENCE

This application is based upon and claims the benefit of priority from the corresponding Japanese Patent Application No. 2019-099367 filed on May 28, 2019, the entire contents of which are incorporated herein by reference.

BACKGROUND

The present disclosure relates to an image forming system and a method for controlling operation of an image forming apparatus.

In an image forming apparatus, such as a printer, a conveyance process may be executed to convey a plurality of sheets placed on sheet placing portions such as sheet supply cassettes, sequentially to a sheet stack portion such as a stack tray. In addition, there is known, as a related technology, an image forming apparatus configured to set an insertion timing and a sheet supply source for each of insertion sheets to be inserted in a sheet bundle that is stacked on the sheet stack portion by the conveyance process.

SUMMARY

An image forming system according to an aspect of the present disclosure includes a conveyance processing portion, a setting processing portion, an insertion processing portion, and an operation control portion. The conveyance processing portion executes a conveyance process to convey a plurality of sheets placed on a sheet placing portion, sequentially to a sheet stack portion. The setting processing portion is configured to set, based on user operations, an insertion timing, a sheet supply source, and a sheet type of an insertion sheet that is to be inserted in a sheet bundle that is stacked on the sheet stack portion during the conveyance process. When the insertion timing to insert the insertion sheet comes during an execution of the conveyance process, the insertion processing portion executes an insertion process to convey a sheet from the sheet supply source of the insertion sheet to the sheet stack portion. The operation control portion is configured to control operations of an image forming apparatus during execution of a sheet bundle output process based on the sheet type of the insertion sheet conveyed in the insertion process that is included in the sheet bundle output process, the sheet bundle output process including the conveyance process and the insertion process.

A method for controlling operation of an image forming apparatus according to another aspect of the present disclosure includes: executing a conveyance process to convey a plurality of sheets placed on a sheet placing portion, sequentially to a sheet stack portion; setting, based on user operations, an insertion timing, a sheet supply source, and a sheet type of an insertion sheet that is to be inserted in a sheet bundle that is stacked on the sheet stack portion during the conveyance process; when the insertion timing to insert the insertion sheet comes during an execution of the conveyance process, executing an insertion process to convey a sheet from the sheet supply source of the insertion sheet to the sheet stack portion; and controlling operations of an image forming apparatus during execution of a sheet bundle output process based on the sheet type of the insertion sheet conveyed in the insertion process that is included in the sheet bundle output process, the sheet bundle output process including the conveyance process and the insertion process.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

Figure 3:
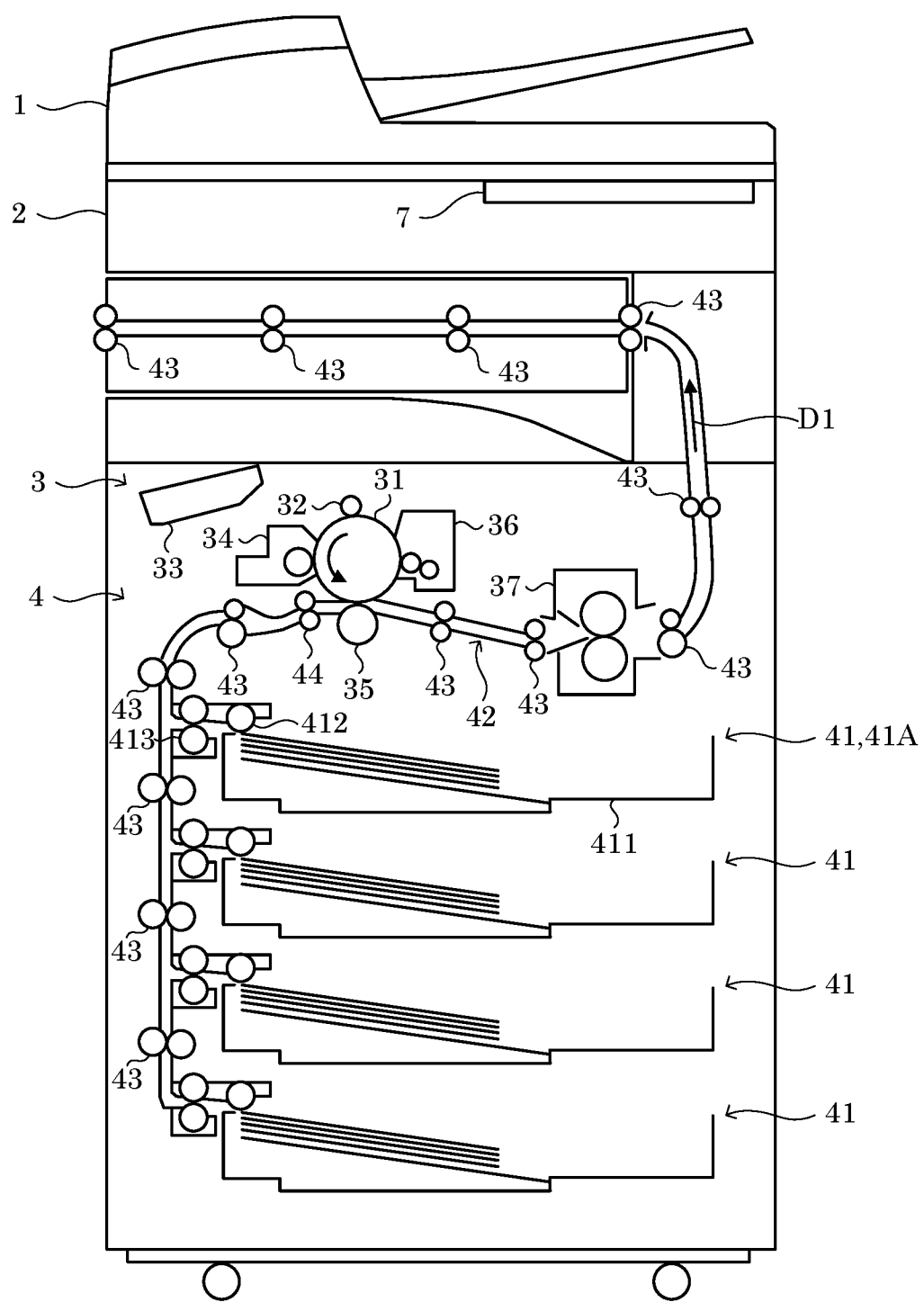
FIG. 3 is a diagram showing a partial configuration of the image forming apparatus according to the embodiment of the present disclosure.
Figure 4:
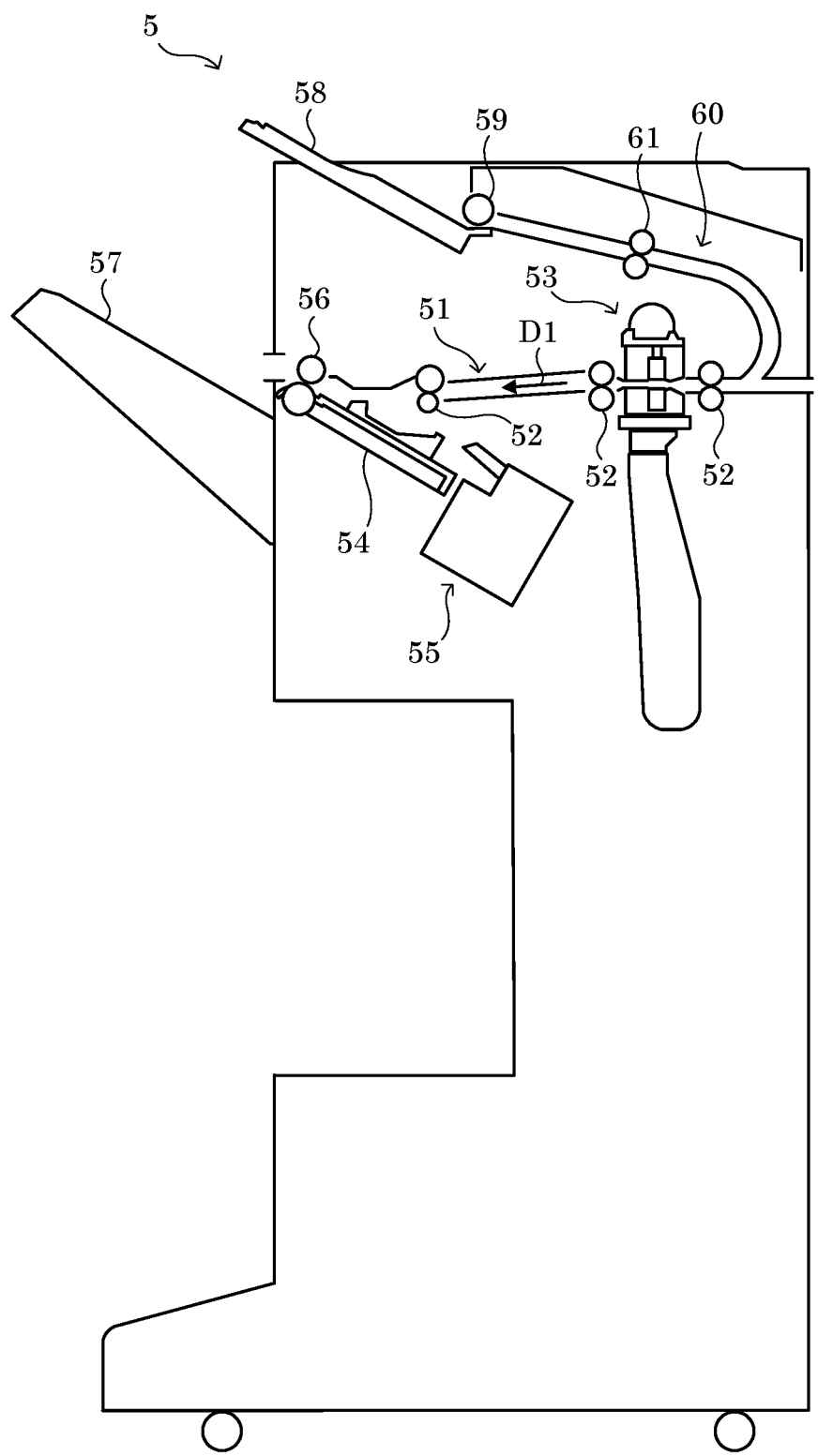
FIG. 4 is a diagram showing a configuration of a post-processing device of the image forming apparatus according to the embodiment of the present disclosure.

First, a configuration of an image forming apparatus 10 according to the embodiment of the present disclosure is described with reference to FIG. 1 to FIG. 4. Here, FIG. 3 is a schematic cross-sectional diagram showing a configuration of an image forming portion 3 and a sheet conveying portion 4. In addition, FIG. 4 is a schematic cross-sectional diagram showing a configuration of a post-processing device 5.

The image forming apparatus 10 is a multifunction peripheral having a plurality of functions such as a scan function for reading image data from a document sheet, a print function for forming an image based on image data, a facsimile function, and a copy function. It is noted that the image forming apparatus 10 may be a printer device, a facsimile device, a copier or the like.

Figure 1:
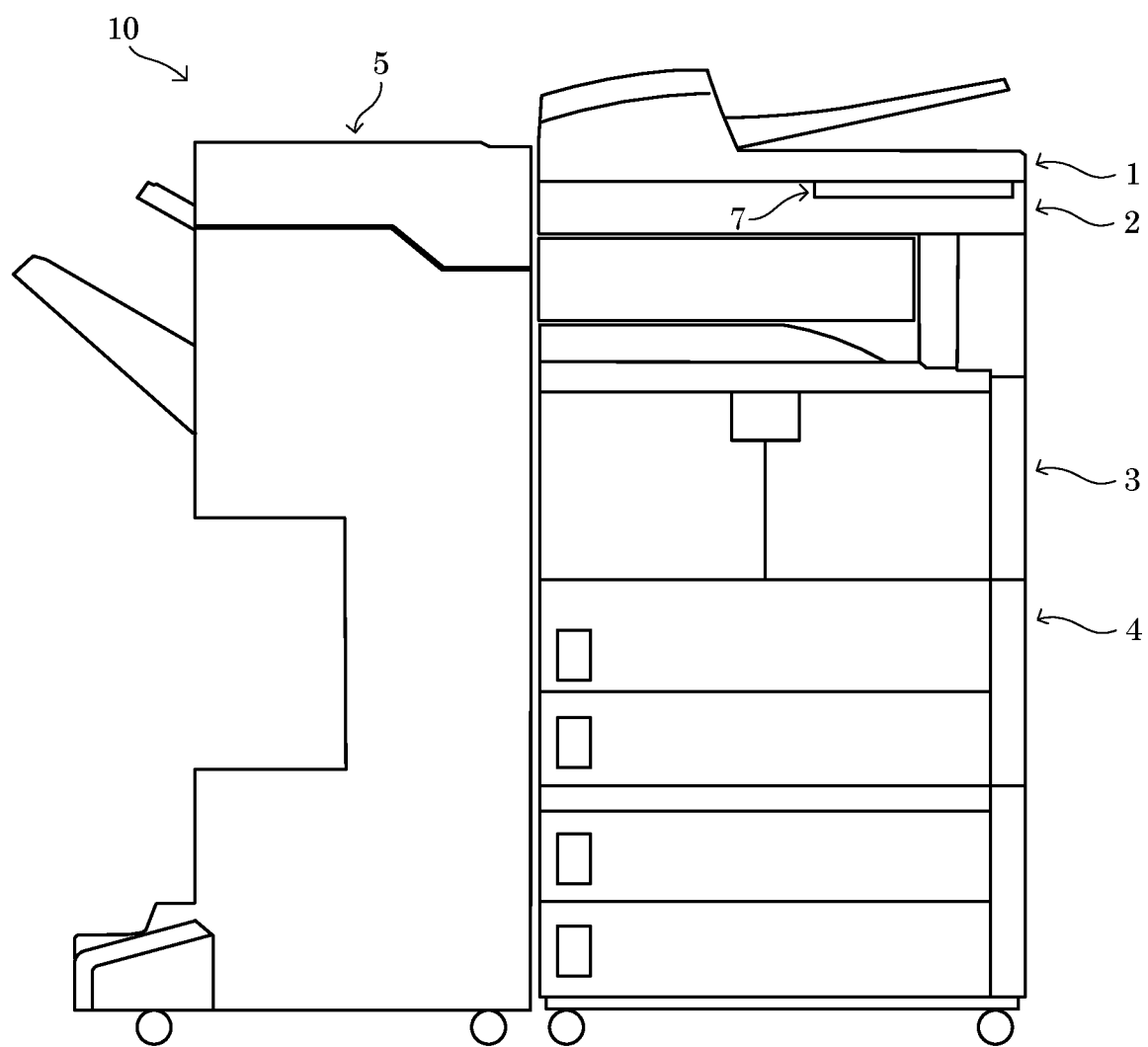
FIG. 1 is a diagram showing an outer appearance configuration of an image forming apparatus according to an embodiment of the present disclosure.
Figure 2:
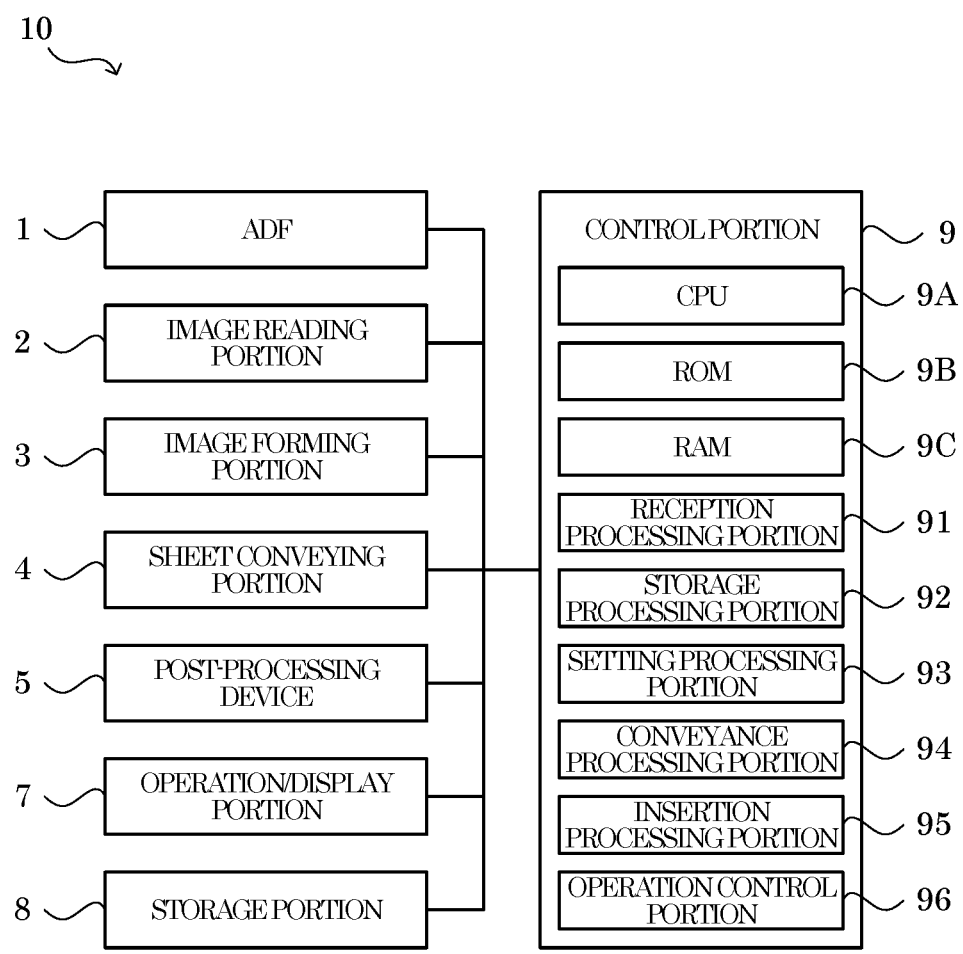
FIG. 2 is a block diagram showing a system configuration of the image forming apparatus according to the embodiment of the present disclosure.

As shown in FIG. 1 and FIG. 2, the image forming apparatus 10 includes an ADF (Auto Document Feeder) 1, an image reading portion 2, the image forming portion 3, the sheet conveying portion 4, the post-processing device 5, an operation/display portion 7, a storage portion 8, and a control portion 9. Here, the image forming apparatus 10 is an example of an image forming system of the present disclosure.

The ADF 1 includes a document sheet setting portion, a plurality of conveyance rollers, a document sheet pressing, and a sheet discharge portion that are not shown, and conveys a document sheet so that it is read by the image reading portion 2. The image reading portion 2 includes a document sheet table, a light source, a plurality of mirrors, an optical lens, and a CCD that are not shown, and reads image data from a document sheet.

The image forming portion 3 is configured to execute an image forming process (print process) to form an image by an electrophotographic method based on image data that was read by the image reading portion 2. In addition, the image forming portion 3 is configured to execute the image forming process based on image data input from an external information processing apparatus such as a personal computer. As shown in FIG. 3, the image forming portion 3 includes a photoconductor drum 31, a charging device 32, a laser scanning unit 33, a developing device 34, a transfer roller 35, a cleaning device 36, and a fixing device 37.

The sheet conveying portion 4 conveys a sheet to the post-processing device 5 via an image forming position where an image is formed by the image forming portion 3. As shown in FIG. 3, the sheet conveying portion 4 includes four sheet supply units 41, a first conveyance path 42, a plurality of conveyance rollers 43, and a resist roller 44.

Each of the four sheet supply units 41 includes a sheet supply cassette 411 (an example of a sheet placing portion of the present disclosure), a pickup roller 412, and a sheet supply roller 413. Sheets on which images are to be formed are placed on the sheet supply cassettes 411. For example, the sheets that may be placed on the sheet supply cassettes 411 include sheets of paper, sheets of coated paper, postcards, envelopes, and OHP sheets. The pickup roller 412 feeds a top sheet among a plurality of sheets placed on the sheet supply cassette 411, to the sheet supply roller 413. The sheet supply roller 413 conveys the sheet fed by the pickup roller 412 to the first conveyance path 42.

The first conveyance path 42, connecting each of the sheet supply cassettes 411 with the post-processing device 5, is a path in which a sheet is moved. For example, the first conveyance path 42 is formed by a pair of guide members provided in a housing of the image forming apparatus 10. The first conveyance path 42 includes the plurality of conveyance rollers 43 and the resist roller 44 that are used for conveying sheets one by one. In the sheet conveying portion 4, a sheet is conveyed by the plurality of conveyance rollers 43 and the resist roller 44 in a conveyance direction D1 shown in FIG. 3.

In the image forming portion 3, an image is formed on a sheet that is conveyed from the sheet conveying portion 4, in the following procedure.

First, the surface of the photoconductor drum 31 is uniformly charged to a predetermined potential by the charging device 32. Next, the laser scanning unit 33 irradiates light based on image data on the surface of the photoconductor drum 31. This allows an electrostatic latent image corresponding to the image data to be formed on the surface of the photoconductor drum 31.

The electrostatic latent image formed on the surface of the photoconductor drum 31 is developed (visualized) as a toner image by the developing device 34. As the photoconductor drum 31 rotates in a direction indicated by an arrow in FIG. 3, the toner image developed by the developing device 34 is conveyed to a transfer position (image formation position) where the toner image is transferred by the transfer roller 35. It is noted that toner is supplied to the developing device 34 from a toner container (not shown) that is attached to the image forming portion 3 in a detachable manner.

On the other hand, in parallel to the image formation operation of the image forming portion 3, the sheet conveying portion 4 conveys a sheet to the image formation position. For example, in a case where the sheet supply cassette 411 of a sheet supply unit 41A (see FIG. 3), among the four sheet supply units 41, is set as a sheet supply source, a plurality of sheets placed on the sheet supply cassette 411 are lifted by a lift plate (not shown) provided in a bottom portion of the sheet supply cassette 411, to a contact position where the sheets are contacted by the pickup roller 412. The pickup roller 412 picks up the top sheet of the plurality of sheets lifted by the lift plate. The sheet picked up by the pickup roller 412 is conveyed by the sheet feed roller 413 to the first conveyance path 42. The sheet conveyed by the sheet feed roller 413 to the first conveyance path 42 is conveyed by the conveyance rollers 43 to the resist roller 44.

The resist roller 44 feeds a sheet to the image formation position in correspondence with the timing when the photoconductor drum 31 carries the toner image to the image formation position. For example, a sensor (not shown) for detecting the passing of the sheet is provided upstream of the resist roller 44 in the conveyance direction D1 in the first conveyance path 42. The control portion 9 sets a timing at which the resist roller 44 feeds the sheet, based on the timing at which the sensor detects the passing of the sheet such that the sheet and the toner image reach the image formation position at the same timing. The resist roller 44 feeds the sheet to the image formation position based on the timing set by the control portion 9. This allows the toner image to be transferred by the transfer roller 35 to the surface of the sheet that has been fed to the image formation position at the timing set by the control portion 9.

It is noted that the toner that has remained on the surface of the photoconductor drum 31 after the transfer of the toner image by the transfer roller 35, is removed by the cleaning device 36. For example, in the cleaning device 36, the toner that has remained on the surface of the photoconductor drum 31 is removed by a blade-like cleaning member. The toner removed by the cleaning member is conveyed to a toner storage container (not shown) by a conveyance screw to be collected therein.

The sheet with the toner image transferred thereto at the image formation position, is conveyed by the conveyance rollers 43 to the fixing device 37. In the fixing device 37, the toner image on the sheet is heated and pressed by the heating roller and the pressure roller. This allows the toner image to be fused and fixed to the sheet. The sheet with the toner image fixed thereto by the fixing device 37 is conveyed by the conveyance rollers 43 to the post-processing device 5.

The post-processing device 5 performs post-processes such as a punching process and a stapling process on a sheet after an image formation conveyed from the sheet conveying portion 4. As shown in FIG. 4, the post-processing device 5 includes a second conveyance path 51, a plurality of conveyance rollers 52, a punching portion 53, a stack tray 54 (an example of a sheet stack portion of the present disclosure), a stapling portion 55 (an example of a post-processing portion of the present disclosure), a discharge roller 56, a discharge tray 57, a sheet supply tray 58 (an example of a sheet placing portion of the present disclosure), a sheet feed roller 59, a third conveyance path 60, and a conveyance roller 61.

The second conveyance path 51, connecting the first conveyance path 42 and the discharge tray 57, is a path in which a sheet is moved. The second conveyance path 51 includes the plurality of conveyance rollers 52 that are used for conveying sheets one by one. In the post-processing device 5, a sheet is conveyed by the plurality of conveyance rollers 52 in the conveyance direction D1 shown in FIG. 4.

The punching portion 53 is provided in the second conveyance path 51 and executes a punching process to punch a punch hole on a sheet conveyed in the second conveyance path 51. The stack tray 54 is provided downstream of the punching portion 53 in the conveyance direction D1 in the second conveyance path 51. On the stack tray 54, sheets conveyed by the plurality of conveyance rollers 52 are stacked. The stapling portion 55 executes a stapling process (an example of a post-process of the present disclosure) to staple a sheet bundle stacked on the stack tray 54. The discharge roller 56 discharges the sheet bundle on which the stapling process was executed by the stapling portion 55, to the discharge tray 57.

On the sheet supply tray 58, a sheet(s) that is to be inserted in the sheet bundle stacked on the stack tray 54, is placed. The sheet feed roller 59 conveys the sheet(s) placed on the sheet supply tray 58 to the third conveyance path 60. The third conveyance path 60, connecting the sheet supply tray 58 and an upstream of the punching portion 53 in the conveyance direction D1 in the second conveyance path 51, is a path in which a sheet is moved. The conveyance roller 61 is provided in the third conveyance path 60 and conveys a sheet that has been conveyed to the third conveyance path 60 by the sheet feed roller 59, to the second conveyance path 51.

The operation/display portion 7 (an example of a display portion of the present disclosure) includes a display portion and an operation portion, wherein the display portion is, for example, a liquid crystal display and displays various types of information in response to control instructions from the control portion 9, and the operation portion is, for example, operation keys or a touch panel for inputting various types of information to the control portion 9 in response to user operations.

The storage portion 8 is a nonvolatile storage device. The storage portion 8 is, for example, a nonvolatile memory such as a flash memory or an EEPROM, or a storage device such as an SSD (Solid State Drive) or an HDD (Hard Disk Drive).

The control portion 9 includes control equipment such as a CPU 9A, a ROM 9B, and a RAM 9C. The CPU 9A is a processor that executes various calculation processes. The ROM 9B is a nonvolatile storage device in which various information such as control programs for causing the CPU 9A to execute various processes are preliminarily stored. The RAM 9C is a volatile storage device that is used as a temporary storage memory (working area) for the various processes executed by the CPU 9A. In the control portion 9, the CPU 9A executes the various control programs stored in advance in the ROM 9B. This allows the image forming apparatus 10 to be controlled comprehensively by the control portion 9. It is noted that the control portion 9 may be formed as an electronic circuit such as an integrated circuit (ASIC), and may be a control portion provided independently of a main control portion that comprehensively controls the image forming apparatus 10.

In the image forming apparatus 10, a conveyance process is executed to convey a plurality of sheets placed on any of the sheet supply cassettes 411 and the sheet supply tray 58, sequentially to the stack tray 54.

Meanwhile, there is known, as a related technology, an image forming apparatus configured to set an insertion timing and a sheet supply source for each of insertion sheets to be inserted in a sheet bundle that is stacked on the stack tray 54 by the conveyance process.

Here, the operation of the conventional image forming apparatus is controlled based on sheet types associated with sheet supply sources that are the sheet supply cassettes 411 and the sheet supply tray 58. For example, in a case where a toner image is transferred and fixed to a sheet conveyed from any one of the sheet supply cassettes 411 by the fixing device 37, the temperature of the fixing device 37 is controlled based on a sheet type associated with the sheet supply cassette 411 from which the sheet is conveyed. In addition, in a case where the stapling process is executed on a sheet bundle stacked on the stack tray 54, it is determined whether or not the stapling process can be executed on the sheet bundle, based on sheet types associated with sheet supply sources of the sheets included in the sheet bundle. Here, with a configuration where, as in the image forming apparatus of the related technology, a sheet supply source is set for each of the insertion sheets, it is difficult to output, without trouble, a sheet bundle that includes a plurality of types of sheets the number of which exceeds the total number of the sheet supply cassettes 411 and the sheet supply tray 58.

On the other hand, as described in the following, the image forming apparatus 10 according to the embodiment of the present disclosure can output, without trouble, a sheet bundle including a plurality of types of sheets the number of which exceeds the total number of the sheet supply cassettes 411 and the sheet supply tray 58.

Specifically, an apparatus control program for causing the CPU 9A of the control portion 9 to execute a registration process (see the flowchart of FIG. 5) and an apparatus control process (see the flowchart of FIG. 6) is stored in advance in the ROM 9B of the control portion 9. It is noted that the apparatus control program may be recorded on a computer-readable recording medium such as a CD, a DVD, or a flash memory, and may be installed from the recording medium to the storage portion 8.

As shown in FIG. 2, the control portion 9 includes a reception processing portion 91, a storage processing portion 92, a setting processing portion 93, a conveyance processing portion 94, an insertion processing portion 95, and an operation control portion 96. Specifically, the control portion 9 executes the apparatus control program stored in the ROM 9B by using the CPU 9A. This allows the control portion 9 to function as the reception processing portion 91, the storage processing portion 92, the setting processing portion 93, the conveyance processing portion 94, the insertion processing portion 95, and the operation control portion 96.

The reception processing portion 91 receives a specification operation performed to specify the content of registration information that is used to set the sheet supply source and the sheet type of an insertion sheet.

For example, the reception processing portion 91 displays, on the operation/display portion 7, a registration screen to receive user operations. For example, on the registration screen, it is possible to input, as the content of the registration information, the name of the registration information, the sheet supply source of the insertion sheet, the sheet type of the insertion sheet, the sheet size of the insertion sheet, and the print image printed on the insertion sheet. For example, a specification operation is performed to confirm the content of the registration information that has been input on the registration screen. It is noted that the registration screen may be configured to receive specification of a print condition of the print image.

For example, on the registration screen, any one of the four sheet supply cassettes 411 and the sheet supply tray 58 is selected as the sheet supply source of the insertion sheet specified in the registration information. In addition, on the registration screen, any one of a plurality of predetermined sheet types such as regular paper, thin paper, cardboard, coated paper, postcard, envelope, and OHP sheet is selected as the sheet type of the insertion sheet specified in the registration information. In addition, on the registration screen, any one of a plurality of predetermined sheet sizes such as A4 vertical, A4 horizontal, and A3 vertical is selected as the sheet size of the insertion sheet specified in the registration information. In addition, on the registration screen, any one of a plurality of images preliminarily stored in the storage portion 8 is selected as the print image specified in the registration information.

When the reception processing portion 91 has received a specification operation, the storage processing portion 92 stores, in the storage portion 8, a piece of registration information that includes the content confirmed by the specification operation.

The setting processing portion 93 sets execution conditions of a sheet bundle output process in accordance with a user operation.

Here, the sheet bundle output process includes the conveyance process and an insertion process. The insertion process is a process in which, when an insertion timing to insert an insertion sheet comes during an execution of the conveyance process, the execution of the conveyance process is stopped, and a sheet is conveyed from the sheet supply source of the insertion sheet to the stack tray 54. In addition, the sheet bundle output process includes a post-processing step in which the stapling process is executed on a sheet bundle that is stacked on the stack tray 54 by the conveyance process and the insertion process. It is noted that the insertion process may be a process in which, when an insertion timing to insert an insertion sheet comes during an execution of the conveyance process, a sheet is conveyed from the sheet supply source of the insertion sheet to the stack tray 54 without stopping the execution of the conveyance process.

For example, the setting processing portion 93 displays, on the operation/display portion 7, a setting screen for the user to set execution conditions of the sheet bundle output process. For example, it is possible to set, on the setting screen, execution conditions of the conveyance process, the insertion process, and the post-processing step that are included in the execution conditions of the sheet bundle output process.

For example, in response to a predetermined first call operation performed on the setting screen, the setting processing portion 93 displays a first specification screen on the operation/display portion 7, the first specification screen being used to specify execution conditions of the conveyance process. For example, on the first specification screen, it is possible to specify the sheet supply source of the sheet conveyed in the conveyance process, the number of sheets conveyed in the conveyance process, whether or not a document sheet image is printed on the sheet conveyed in the conveyance process, and the print condition of the document sheet image.

In addition, in response to a predetermined second call operation performed on the setting screen, the setting processing portion 93 displays a second specification screen (an example of a selection screen of the present disclosure) on the operation/display portion 7, the second specification screen being used to specify execution conditions of the insertion process. For example, on the second specification screen, it is possible to specify an insertion timing, a sheet supply source, a sheet type, and a sheet size of the insertion sheet, whether or not to print an image on the insertion sheet, and a print condition of the image. For example, on the second specification screen, the insertion timing of the insertion sheet is specified by using the number of pages of the document sheet printed in the conveyance process.

Here, on the second specification screen, the sheet supply source, the sheet type, the sheet size, and the print image of the insertion sheet can be specified by using the registration information stored in the storage portion 8.

Specifically, in a case where one or more pieces of registration information are stored in the storage portion 8, the setting processing portion 93 displays the one or more pieces of registration information on the second specification screen in a selectable manner. For example, on the second specification screen, the setting processing portion 93 displays the one or more pieces of registration information in association with one or more sheet supply sources that are respectively specified therein, each of the sheet supply sources being any one of the sheet supply cassettes 411 and the sheet supply tray 58. For example, the setting processing portion 93 displays respective names of the one or more pieces of registration information vertically or horizontally adjacent to the one or more sheet supply sources that are each any one of the sheet supply cassettes 411 and the sheet supply tray 58. It is noted that on the second specification screen, the setting processing portion 93 may not display the one or more sheet supply sources that are respectively specified in the one or more pieces of registration information, each of the sheet supply sources being any one of the sheet supply cassettes 411 and the sheet supply tray 58.

When, on the second specification screen, any one of the names of registration information is selected, the setting processing portion 93 determines that the content of the selected piece of registration information has been specified as the sheet supply source, the sheet type, the sheet size, and the print image of the insertion sheet. In this case, compared with a case where the sheet supply source, the sheet type, the sheet size, and the print image of the insertion sheet are individually selected, the labor of the user for the operation is saved. It is noted that the second specification screen may receive individual specifications of the sheet supply source, the sheet type, the sheet size, and the print image of the insertion sheet. In addition, when the sheet type is not specified on the second specification screen, the setting processing portion 93 may determine that a sheet type associated with the specified sheet supply source has been specified.

It is noted that the setting processing portion 93 may display, on the operation/display portion 7, a list screen for viewing the insertion timing, the sheet supply source, the sheet type, the sheet size, and the print image for each of insertion sheets specified by user operations. For example, in the list screen, the insertion timing, the sheet supply source, the sheet type, the sheet size, and the print image for each insertion sheet may be displayed in a list format.

In addition, in response to a predetermined third call operation performed on the setting screen, the setting processing portion 93 displays a third specification screen on the operation/display portion 7, the third specification screen being used to specify execution conditions of the post-processing step. For example, on the third specification screen, it is possible to specify whether or not to execute the stapling process.

When a predetermined confirmation operation has been performed on the setting screen, the setting processing portion 93 sets the execution conditions of the sheet bundle output process based on specifications that had been made on the first specification screen, the second specification screen, and the third specification screen before the confirmation operation was performed.

Here, based on the execution conditions specified on the second specification screen, the setting processing portion 93 sets the insertion timing, the sheet supply source, the sheet type, and the sheet size of each of insertion sheets that are to be inserted in the sheet bundle that is stacked on the stack tray 54 during the conveyance process, and sets the print image printed on the insertion sheet, and the print condition of the print image.

In addition, when a piece of registration information is selected on the second specification screen, the setting processing portion 93 sets the sheet supply source, the sheet type, the sheet size, and the print image of the insertion sheet based on the selected piece of registration information.

It is noted that the setting processing portion 93 may not set either or both of the sheet size of the insertion sheet and the print image printed on the insertion sheet.

The conveyance processing portion 94 executes the conveyance process in accordance with the execution conditions of the conveyance process set by the setting processing portion 93.

The insertion processing portion 95 executes the insertion process when the insertion timing of the insertion sheet comes during an execution of the conveyance process.

In a case where a print image has been set with respect to the insertion sheet conveyed in the insertion process, the insertion processing portion 95 causes the image forming portion 3 to print the print image on the insertion sheet.

The operation control portion 96 is configured to control the operation of its associated apparatus during the execution of the sheet bundle output process based on the sheet type of the insertion sheet conveyed in the insertion process that is included in the sheet bundle output process.

Specifically, when the insertion sheet conveyed in the insertion process is conveyed to the stack tray 54 via the fixing device 37, the operation control portion 96 controls the operation of the fixing device 37 based on the sheet type of the insertion sheet, not the sheet type associated with the sheet supply source of the insertion sheet.

For example, in the image forming apparatus 10, first table data is preliminarily stored in the storage portion 8, wherein in the first table data, sheet types are associated with temperatures of the heating roller.

When the insertion sheet conveyed in the insertion process is conveyed to the stack tray 54 via the fixing device 37, the operation control portion 96 consults the first table data to identify a temperature of the heating roller associated with the sheet type of the insertion sheet. Subsequently, the operation control portion 96 controls the drive of the fixing device 37 so that temperature of the heating roller changes to the identified temperature.

In addition, the operation control portion 96 controls the operation of the stapling portion 55 based on the sheet type associated with the sheet supply source of the sheet conveyed in the conveyance process, and the sheet type of the insertion sheet conveyed in the insertion process.

For example, in the image forming apparatus 10, second table data is preliminarily stored in the storage portion 8, wherein in the second table data, sheet types are associated with sheet thicknesses.

In a case where the sheet bundle output process includes the post-processing step, the operation control portion 96 identifies the number of sheets for each of a plurality of types of sheets included in the sheet bundle that is to be subjected to the stapling process in the post-processing step. In addition, the operation control portion 96 identifies the thickness for each of a plurality of types of sheets included in the sheet bundle that is to be subjected to the stapling process, and calculates the thickness of the sheet bundle based on the identified number of sheets and thickness. In addition, when the calculated thickness of the sheet bundle exceeds a predetermined upper limit value, the operation control portion 96 restricts the execution of the stapling process on the sheet bundle.

In addition, the operation control portion 96 controls conveyance of the insertion sheet by the sheet conveying portion 4 and the post-processing device 5 based on the sheet size of the insertion sheet conveyed in the insertion process.

For example, in the image forming apparatus 10, one or more sheet sensors for detecting paper jams are provided in each of the first conveyance path 42, the second conveyance path 51, and the third conveyance path 60.

The operation control portion 96 calculates, based on the sheet size of the insertion sheet, passage times at which the insertion sheet conveyed in the insertion process passes the sheet sensors. In a case where a passage of the insertion sheet is not detected at any sheet sensors after the calculated passage time elapses, the operation control portion 96 determines that a paper jam has occurred there. In this case, the operation control portion 96 stops the sheet bundle output process.

It is noted that the control portion 9 may not include the reception processing portion 91 and the storage processing portion 92. In this case, predetermined registration information may be or may not be stored in the storage portion 8.

[Registration Process]

Figure 5:
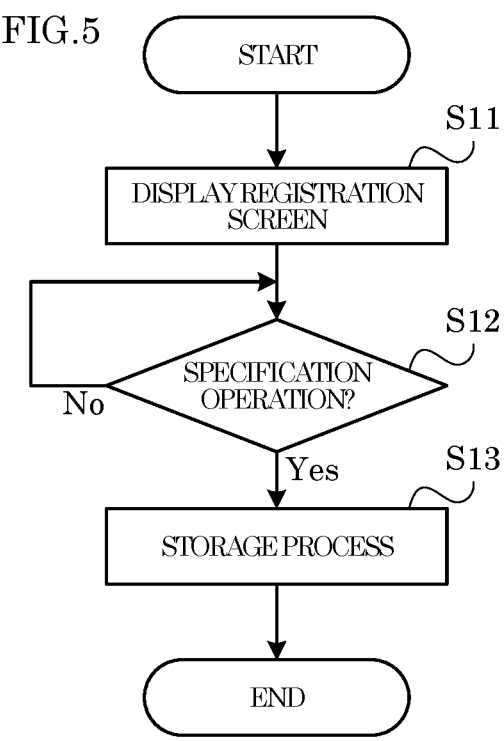
FIG. 5 is a flowchart showing an example of a registration process executed by the image forming apparatus according to the embodiment of the present disclosure.

In the following, with reference to FIG. 5, a description is given of an example of the procedure of the registration process executed by the control portion 9 in the image forming apparatus 10. Here, steps S11, S12, . . . represent numbers assigned to the processing procedures (steps) executed by the control portion 9. It is noted that the registration process is executed in response to a user operation instructing to execute the registration process performed on the operation/display portion 7.

<Step S11>

First, in step S11, the control portion 9 displays the registration screen on the operation/display portion 7. Here, the process of step S11 is executed by the reception processing portion 91 of the control portion 9.

<Step S12>

In step S12, the control portion 7 determines whether or not the specification operation has been received on the registration screen.

Here, upon determining that the specification operation has been received on the registration screen (Yes side at S12), the control portion 9 moves the process to step S13. In addition, upon determining that the specification operation has not been received on the registration screen (No side at S12), the control portion 9 waits at step S12 to receive the specification operation.

<Step S13>

In step S13, the control portion 9 executes a storage process to store, in the storage portion 8, the registration information that includes the content confirmed by the specification operation received in step S12. Here, the process of step S13 is executed by the storage processing portion 92 of the control portion 9.

[Apparatus Control Process]

Figure 6:
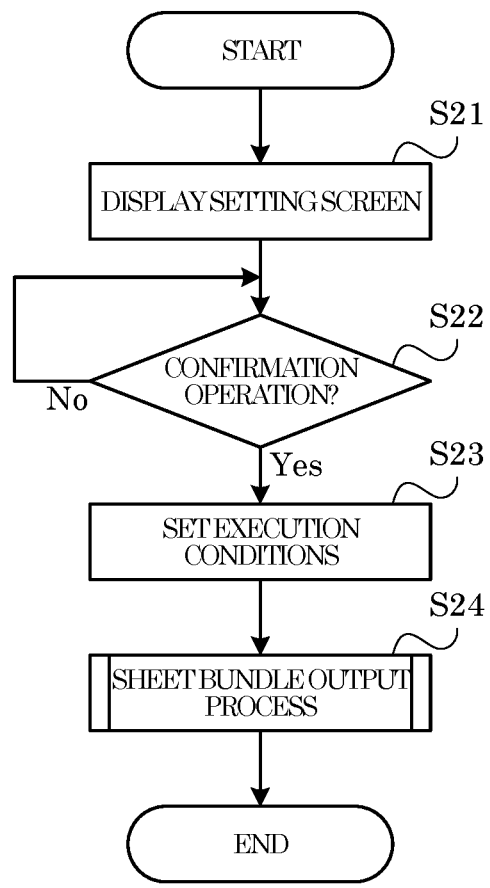
FIG. 6 is a flowchart showing an example of an apparatus control process executed by the image forming apparatus according to the embodiment of the present disclosure.

In the following, with reference to FIG. 6, a description is given of an example of the procedure of an apparatus control process executed by the control portion 9 in the image forming apparatus 10. It is noted that the apparatus control process is executed in response to a user operation instructing to execute the apparatus control process performed on the operation/display portion 7.

<Step S21>

First, in step S21, the control portion 9 displays the setting screen on the operation/display portion 7.

In the setting screen, in response to the first call operation, the first specification screen is displayed, wherein the first specification screen is used to specify the content of the execution conditions of the conveyance process. In addition, in response to the second call operation, the second specification screen is displayed, wherein the second specification screen is used to specify the content of the execution conditions of the insertion process. In addition, in response to the third call operation, the third specification screen is displayed, wherein the third specification screen is used to specify the content of the execution conditions of the post-processing step.

<Step S22>

In step S22, the control portion 9 determines whether or not the confirmation operation has been performed on the setting screen.

Here, upon determining that the confirmation operation has been performed on the setting screen (Yes side at S22), the control portion 9 moves the process to step S23. In addition, upon determining that the confirmation operation has not been performed on the setting screen (No side at S22), the control portion 9 waits at step S22 for the confirmation operation to be performed.

<Step S23>

In step S23, the control portion 9 sets the execution conditions of the sheet bundle output process based on the contents of specifications that had been made on the first specification screen, the second specification screen, and the third specification screen before the confirmation operation was performed. Here, the processes of steps S21 to S23 are executed by the setting processing portion 93 of the control portion 9.

<Step S24>

In step S24, the control portion 9 executes the sheet bundle output process.

[Sheet Bundle Output Process]

Figure 7:
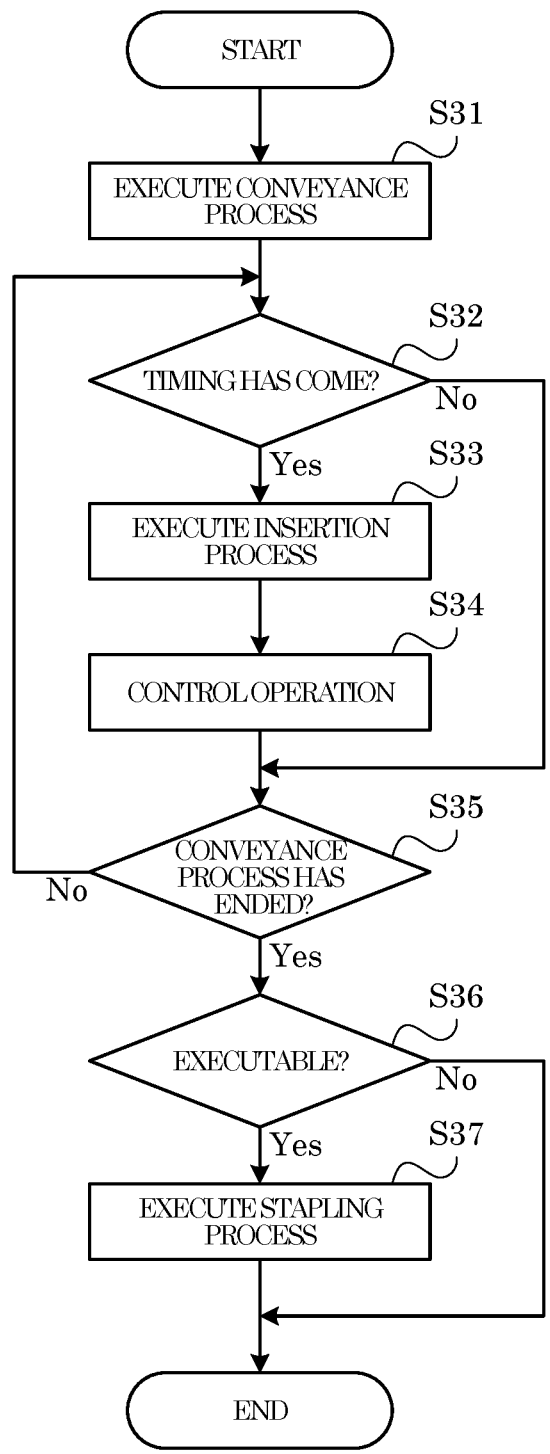
FIG. 7 is a flowchart showing an example of a sheet bundle output process executed by the image forming apparatus according to the embodiment of the present disclosure.

In the following, with reference to FIG. 7, a description is given of an example of the procedure of the sheet bundle output process executed in step S24 of the apparatus control process.

<Step S31>

First, in step S31, the control portion 9 executes the conveyance process in accordance with the execution conditions of the conveyance process set in step S23. Here, the process of step S31 is executed by the conveyance processing portion 94 of the control portion 9. It is noted that the processes of the following steps S32 to S35 are executed in parallel with the conveyance process.

<Step S32>

In step S32, the control portion 9 determines whether or not the insertion timing of the insertion sheet has come, based on the execution conditions of the insertion process set in step S23.

Here, upon determining that the insertion timing of the insertion sheet has come (Yes side at S32), the control portion 9 moves the process to step S33. In addition, upon determining that the insertion timing of the insertion sheet has not come (No side at S32), the control portion 9 moves the process to step S35.

<Step S33>

In step S33, the control portion 9 executes the insertion process based on the execution conditions of the insertion process set in step S23. Here, the process of step S33 is executed by the insertion processing portion 95 of the control portion 9.

<Step S34>

In step S34, the control portion 9 controls the operation of its associated apparatus based on the execution conditions of the insertion process set in step S23. Here, the process of step S34 is executed by the operation control portion 96 of the control portion 9.

For example, when the insertion sheet conveyed in the insertion process is conveyed to the stack tray 54 via the fixing device 37, the control portion 9 controls the operation of the fixing device 37 based on the sheet type of the insertion sheet.

In addition, the control portion 9 controls the conveyance of the insertion sheet by the sheet conveying portion 4 and the post-processing device 5 based on the sheet size of the insertion sheet conveyed in the insertion process.

<Step S35>

In step S35, the control portion 9 determines whether or not the conveyance process has ended.

Here, upon determining that the conveyance process has ended (Yes side at S33), the control portion 9 moves the process to step S36. In addition, upon determining that the conveyance process has not ended (No side at S35), the control portion 9 moves the process to step S32.

<Step S36>

In step S36, the control portion 9 determines whether or not the stapling process can be executed on the sheet bundle stacked on the stack tray 54, based on the execution conditions of the conveyance process and the insertion process set in step S23. Here, the process of step S36 is executed by the operation control portion 96 of the control portion 9.

Specifically, the control portion 9 identifies the number of sheets for each of a plurality of types of sheets included in the sheet bundle stacked on the stack tray 54. In addition, the control portion 9 identifies the thickness for each of the plurality of types of sheets included in the sheet bundle, based on the second table data, and calculates the thickness of the sheet bundle based on the identification result. In addition, when the calculated thickness of the sheet bundle is equal to or lower than the upper limit value, the control portion 9 determines that the stapling process can be executed.

Here, upon determining that the stapling process can be executed on the sheet bundle stacked on the stack tray 54 (Yes side at S36), the control portion 9 moves the process to step S37. In addition, upon determining that the stapling process cannot be executed on the sheet bundle stacked on the stack tray 54 (No side at S36), the control portion 9 ends the sheet bundle output process. In this case, the control portion 9 notifies that the stapling process cannot be executed.

<Step S37>

In step S37, the control portion 9 executes the stapling process. Subsequently, the control portion 9 discharges the sheet bundle after the stapling process to the discharge tray 57.

As described above, in the image forming apparatus 10, the user can set the sheet supply source and the sheet type of each insertion sheet that is to be inserted in a sheet bundle that has been stacked on the stack tray 54 by the conveyance process. With this configuration, for example, even when a plurality of types of sheets are stored in one of the sheet supply cassettes 411 and a plurality of insertion sheets are conveyed from that sheet supply cassette 411, it is possible to control the operation of the image forming apparatus 10 based on the sheet type of each of the conveyed insertion sheets. Accordingly, it is possible to output, without trouble, a sheet bundle including a plurality of types of sheets the number of which exceeds the total number of the sheet supply cassettes 411 and the sheet supply tray 58.

It is noted that the image forming portion 3 may form an image by an image formation method, such as the inkjet method, that is different from the electrophotography method.

In addition, the post-processing device 5 may include, in place of the stapling portion 55, a post-processing portion that executes a post-process, such as a double folding process, that is different from the stapling process, on a sheet bundle stacked on the stack tray 54. In addition, the image forming apparatus 10 may not include the post-processing device 5.

In addition, the reception processing portion 91, the storage processing portion 92, and the setting processing portion 93 of the control portion 9 may be provided in an information processing apparatus, such as a personal computer, that is communicably connected to the image forming apparatus 10. In this case, a configuration including the image forming apparatus 10 and the information processing apparatus is another example of the image forming system of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
a sheet placing portion preliminarily associated with a sheet type;
a conveyance processing portion configured to execute a conveyance process to convey a plurality of sheets placed on the sheet placing portion, sequentially to a sheet stack portion;
a setting processing portion configured to set an insertion timing, a sheet supply source, and a sheet type of an insertion sheet, based on user operations that individually specify the insertion timing, the sheet supply source, and the sheet type of the insertion sheet that is to be inserted in a sheet bundle that is stacked on the sheet stack portion during the conveyance process;
an insertion processing portion configured to, when the insertion timing to insert the insertion sheet comes during an execution of the conveyance process, execute an insertion process to convey a sheet from the sheet supply source of the insertion sheet to the sheet stack portion; and
an operation control portion configured to control operations of an image forming apparatus during execution of a sheet bundle output process based on the sheet type of the insertion sheet conveyed in the insertion process that is included in the sheet bundle output process, the sheet bundle output process including the conveyance process and the insertion process.

2. The image forming system according to claim 1, further comprising:
a storage portion storing one or more pieces of registration information that are used to set the sheet supply source and the sheet type of the insertion sheet, wherein
the setting processing portion is configured to set the sheet supply source and the sheet type of the insertion sheet based on a piece of registration information that is selected by a user operation from the one or more pieces of registration information stored in the storage portion.

3. The image forming system according to claim 2, further comprising:
a reception processing portion configured to receive a specification operation performed to specify content of the registration information; and
a storage processing portion configured to, when the reception processing portion has received the specification operation, store a piece of registration information that includes content specified by the specification operation, in the storage portion.

4. The image forming system according to claim 2, wherein
the setting processing portion displays, on a display portion, a selection screen on which are displayed one or more pieces of registration information in association with one or more sheet placing portions that are set as sheet supply sources in the one or more pieces of registration information, and receive a user operation for selecting a piece of registration information on the selection screen.

5. The image forming system according to claim 1, wherein
the setting processing portion is configured to display, on the display portion, a list screen for viewing the insertion timing, the sheet supply source, and the sheet type for each of insertion sheets specified by user operations.

6. The image forming system according to claim 1, further comprising:
a post-processing portion configured to execute a predetermined post-process on a sheet bundle stacked on the sheet stack portion, wherein
the sheet bundle output process includes using the post-processing portion to execute the post-process on a sheet bundle that is stacked on the sheet stack portion by the conveyance process and the insertion process, and
the operation control portion is configured to control operations of the post-processing portion based on a sheet type of the insertion sheet conveyed in the insertion process.

7. The image forming system according to claim 1, further comprising:
a fixing portion configured to, after a toner image has been transferred to a sheet, fix the toner image to the sheet, wherein
when the insertion sheet conveyed in the insertion process is conveyed to the sheet stack portion via the fixing portion, the operation control portion is configured to control operations of the fixing portion based on the sheet type of the insertion sheet.

8. The image forming system according to claim 1, wherein the setting processing portion is configured to set, based on user operations, a sheet size of the insertion sheet in addition to the insertion timing, the sheet supply source, and the sheet type of the insertion sheet, and the operation control portion is configured to control conveyance of the insertion sheet based on the sheet size of the insertion sheet conveyed in the insertion process.

9. The image forming system according to claim 1, wherein the setting processing portion is configured to set, based on user operations, a print image printed on the insertion sheet, in addition to the insertion timing, the sheet supply source, and the sheet type of the insertion sheet, and in a case where a print image has been set with respect to the insertion sheet conveyed in the insertion process, the insertion processing portion prints the print image on the insertion sheet.

10. A method for controlling operation of an image forming apparatus that is executed in an image forming system including a sheet placing portion preliminarily associated with a sheet type, the method comprising:

executing a conveyance process to convey a plurality of sheets placed on the sheet placing portion, sequentially to a sheet stack portion;

setting an insertion timing, a sheet supply source, and a sheet type of an insertion sheet, based on user operations that individually specify the insertion timing, the sheet supply source, and the sheet type of the insertion sheet that is to be inserted in a sheet bundle that is stacked on the sheet stack portion during the conveyance process;

when the insertion timing to insert the insertion sheet comes during an execution of the conveyance process, executing an insertion process to convey a sheet from the sheet supply source of the insertion sheet to the sheet stack portion; and controlling operations of an image forming apparatus during execution of a sheet bundle output process based on the sheet type of the insertion sheet conveyed in the insertion process that is included in the sheet bundle output process, the sheet bundle output process including the conveyance process and the insertion process.

* * * * *